United States Patent Office 3,745,183
Patented July 10, 1973

3,745,183
PROCESS FOR PRODUCING ALKYL
TIN HALIDES
Tatsuo Katsumura, Osaka-fu, Tetsuya Matsunaga, Fuseshi, Osaka, and Tadasu Tahara, Konohana-ku, Osaka, Japan, and Reiichi Suzuki, Cambridge, Mass., assignors to Nitto Chemical Industries Co., Ltd., Osaka, Japan
No Drawing. Filed Apr. 17, 1964, Ser. No. 360,732
Claims priority, application Japan, Apr. 18, 1963,
38/19,787
Int. Cl. C07f 7/22
U.S. Cl. 260—429.7     23 Claims

ABSTRACT OF THE DISCLOSURE

According to one of its aspects, this invention relates to a process for producing alkyl tin halides having the general formula $R_mSnX_{4-m}$ wherein R is an alkyl radical containing 1–12 carbon atoms, X is an active halogen atom, and $m$ is an integer 1–3, which comprises reacting metallic tin with an alkyl halide having the general formula RX, wherein R and X are as hereinbefore indicated, said reaction being effected in the presence of catalytic amounts of (a) at least one compound selected from the group consisting of nitrogen-containing organic compounds, phosphorus-containing organic compounds, ammonia, hydrazine, hydroxylamine, and salts thereof, and (b) at least one iodine-containing compound.

---

This invention relates to a process for producing alkyl tin halides and, in particular, to a process for producing alkyl tin halides in good yield directly from metallic tin and alkyl halides.

The alkyl tin halides are of importance commercially as they are used in considerable quantities, for example, as starting materials to prepare stabilizers for chlorine-containing synthetic resins such as polyvinyl chloride, as toxicants in agricultural chemicals, germicides, antiseptics, and paints for the bottom of ships, and many other uses. The Grignard and numerous other processes for producing alkyl tin halides have been studied in the past, but these have been very expensive to operate. Hence, there has been a demand in the art all along up to the present for a better process for their manufacture. It has been appreciated that the most convenient and economical process would be one in which the alkyl halides are directly reacted with metallic tin. A fully satisfactory process, however, has not been established as yet. Various prior attempts to utilize this type of reaction have been unsuccessful because inter alia of low yield and/or unfavorable reaction conditions.

For example, T. Karantasis reports that by heating various alkyl iodides and tin in a sealed tube for 20–30 hours at a temperature of 140–180° C. dialkyl tin diiodides were synthesized, Compt. rend. 205, 460–462 (1937). The utilization, however, of this process did not materialize commercially because the reaction rate of this process was very low, the reaction time was long, and also due to the formation of excessive amounts of by-products the yield of the intended dialkyl tin diiodides was low.

Subsequently, a process was proposed for producing dimethyl tin dichloride or dibromide by introducing methyl chloride or methyl bromide into molten tin in the presence of a metallic catalyst such as silver or copper. The defects of this process were that there was the necessity for an elevated temperature in the neighborhood of 300° C. and that the conversion of the tin per unit time was low. A further defect was that, according to this process, when the alkyl group contained two or more carbon atoms, i.e. when it was an ethyl group or higher, the alkyl halides would pyrolyze, with the result that the formation of the intended tin compounds would hardly occur and hence its application would be restricted to the instance of those methyl groups mentioned above.

A process of carrying out in a similar manner the reaction of methyl chloride or alkyl bromide with tin in the presence of the three components consisting of a small quantity of metallic magnesium, an organic solvent and alkyl iodide is also known. In this process, when the alkyl chlorides other than the methyl chloride are used as the starting materials, side reactions occur with the result that the yield of the intended product is very low. On the other hand, in the case alkyl bromide is used as the starting material, if the alkyl group is of long chain, the yield shows a pronounced decline. Thus, its applicability being narrowly restricted, it is not of much worth considered from the commercial standpoint.

The conventional processes of directly synthesizing alkyl tin halides, as hereinabove described, are defective from the commercial standpoint in one or more respects, such as that their reaction temperature is high, their reaction rate is low, or the range of compounds to which they were applicable is highly restricted.

As a result of our intensive research over a long period of time on the subject of the direct synthesis of the various alkyl tin halides, we found a highly effective catalyst for this reaction, such as hereinafter described, by which we succeeded in eliminating the various drawbacks of the prior art processes.

An object of the present invention is to provide a commercially feasible process for the direct synthesis of alkyl tin halides.

Another object of the invention is to provide a process for producing organotin halides which may have a wide range of alkyl groups including short chain alkyl groups, long chain alkyl groups, and cycloalkyl groups.

A still further object is to provide a process for producing alkyl tin halides which is not restricted as in the conventional processes to specific halides, but which can be applied in like manner to the production of a wide range of alkyl tin halides.

A further object of this invention is to provide a process for producing alkyl tin halides at a temperature comparable to or lower than the conventional processes and in a shorter time.

A still further object of the invention is to provide a process for selectively producing dialkyl tin dihalides, especially dialkyl tin diiodides.

Other objects and advantages of the present invention will be apparent from the following description.

The present invention is directed to a process for producing alkyl tin halides having the general formula, $$R_mSnX_{4-m}$$

wherein R is an alkyl radical containing 1–12 carbon atoms, X is an active halogen atom, and $m$ is an integer 1–3, which comprises reacting metallic tin with an alkyl halide having the general formula RX, wherein R and X are as hereinabove indicated, said reaction being carried out in the presence of catalytic amounts of (a) at least one compound selected from the group consisting of nitrogen-containing organic compounds, phosphorus-containing organic compounds, ammonia, hydroxylamine, hydrazine, and salts thereof, and (b) at least one iodine-containing compound.

The present invention is based on our discovery that the foregoing components (a) and (b) function very effectively as catalysts of this reaction such as to satisfy all of the above recited objects of the invention.

The material metallic tin to be used according to the process of this invention may be of any form such as a powder, foil, flaskes, or granules, but considering the largeness of the surface area for facilitating the accomplishment of the reaction smoothly and the convenience of handling, preferred are those in foil or granular form having fresh surface.

The alkyl halides RX which may be used in the practice of the process of the invention may include alkyl chlorides, bromides, and iodides. The alkyl radical of the alkyl halide may be either in the form of a straight chain or branched, specific examples of the alkyl radical including such as methyl, ethyl, n-propyl, isopropyl, n-butyl, isobutyl, sec-butyl, n-amyl, isoamyl, n-hexyl, n-heptyl, n-octyl, 2-ethylhexyl, n-decyl and n-dodecyl. The alkyl halides may include cycloalkyl halides such as those in which the cycloalkyl radical is, for example, cyclopentyl, cyclohexyl, and decahydronaphthyl or those having a side chain such as 4-methylcyclohexyl.

In the alkyl halide RX, X may be an active halogen atom, e.g. chlorine, bromine, or iodine.

The first component of the catalyst system as used in the process of this invention may be selected from the group consisting of a nitrogen-containing organic compound, a phosphorus-containing organic compound, ammonia, hydroxylamine, hydrazine, and salts thereof. The nitrogen-containing organic compounds may include primary, secondary, and tertiary aliphatic and aromatic amines including alkyl, alkenyl, aryl, aralkyl, alkaryl, or acyl groups which may bear inert substituents including hydroxy, alkoxy, phenoxy, halogen, carboxy, carboalkoxy, nitro or nitroso substituents; substituted and non-substituted 3–6 membered N-containing heterocyclic compounds, which may be condensed with another ring, having at least one N-atom; salts formed from the foregoing with hydrogen halides, oxy acids, alkyl-, alkenyl-, aralkyl-, aryl-, alkaryl-halides, and organic acids; the catalyst action of the abovementioned N-containing organic compoundes is not affected by the influence of various substituents in the organic radicals.

Typical illustrative examples may include aliphatic and aromatic amines and nitrogen-containing heterocyclic compounds which may include methylamine, ethylamine, butylamine, octylamine, ethylene diamine, cyclohexylamine, allyl amine, aniline, o-, m-, and p-toluidine, alpha- and beta-naphthylamine, o-, m-, and p-chloroaniline, benzylamine, o-, m-, and p-chlorobenzylamine, dimethylamine, diethylamine, dibutylamine, dioctylamine, N-methylaniline, N-ethylaniline, N-methylnaphthylamine, dibenzylamine, N-methylbenzylamine, pyrrole, piperidine, morpholine, trimethylamine, triethylamine, tributylamine, ethyldibutylamine, dimethylaniline, dimethylnaphthylamine, tribenzylamine, triethanolamine, triethylenediamine, N-methylmorpholine, pyridine, alpha-, beta-, and gamma-picoline, quinoline, bipyridyl, phenanthroline, dimethyliodoamine, butyldichloroamine; amides, such as acetamide, acetanilide, and benzene sulfonamide; hydrazines such as asymdimethylhydrazine and phenylhydrazine and semicarbazide and their derivatives with ketones and aldehydes; azo compounds such as azobenzene and diazoaminobenzene; the ammonium salts obtained by reacting the foregoing compounds with hydrogen halides, oxy acids, organic acids, or alkyl, alkenyl, aryl, alkaryl, or aralkyl halides; salts of ammonia of organic acids such as ammonium acetate, ammonium laurate, ammonium benzoate, ammonium lactate, ammonium glutaminate and ammonium benzene sulfonate, and ureas and urethanes.

By way of illustration, said salts of ammonia of inorganic acids such as hydrogen halides and oxyacids include ammonium chloride, ammonium bromide, ammonium iodide; ammonium sulfite, ammonium phosphate and ammonium phosphite; and said salts derived from hydroxylamine and hydrazine include hydrogen halide salts and the others and hydrazine hydrate also.

The phosphorus-containing organic compounds may include those having the following general formulae:

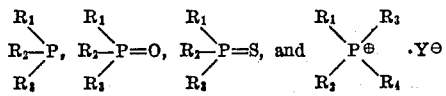

wherein $R_1$, $R_2$, $R_3$, and $R_4$ may be hydrogen atom, alkyl, aryl, aralkyl, alkaryl, alkoxy, aryloxy, alkylthio, arylthio, N-alkylamino, N,N-dialkylamino, and hydroxy radical, or halogen atom, it being permissible for all of the $R_1$, $R_2$, $R_3$, and $R_4$ to be the same or a part or all of them to differ from each other; however, it is undesirable for the reaction that all of $R_1$, $R_2$, $R_3$, and $R_4$ are either hydroxy radicals or halogens; and Y is an active halogen, e.g. Cl, Br, or I.

Examples of suitable phosphorus containing compounds are as follows:

phosphines such as triethylphosphine, triphenylphosphine, dibutylphosphine and phenylphosphine; halophosphines such as diphenylchlorophosphine and dibutylbromophosphine; phosphonium halides such as tetraethylphosphonium iodide and phenyl-ethyl-tetramethylenephosphonium iodide; halophosphine halides such as triethylphosphorus dichloride and diphenylphosphorus trichloride; phosphites such as triethylphosphite and triphenylphosphite;

halosposphites such as chlorodiethylphosphite and bromodiphenylphosphite; thiophosphites such as triethylthiophosphite and triphenylthiophosphite; amidophosphites such as tris-(diethylamino)-phosphine and tri-N,N',N''-(4-pyridyl)phosphorous amide;

phosphine oxides such as trimethylphosphine oxide and triphenylphosphine oxide; phosphates such as triethylphosphate and triphenylphosphate; thiophosphates such as triethylthiophosphate and triphenylthiophate;

phosphonyl halides such as ethyl-phenylphosphonyl chloride and dibutylphosphonyl chloride;

quasi-phosphonium compounds such as triphenoxyphosphorus dichloride and triphenoxy-methylphosphorous iodide; phosphonous acids such as n-propylphosphonous acid and phenylphosphonous acid and esters thereof;

phosphonic acids such as phenylphosphonic acid and methylphenylphosphonic acid and esters thereof;

phosphinous acid esters such as dibutylphosphinous acid ethyl ester and diphenylphosphinous acid methyl ester.

The second component of the catalyst system as used in the process of this invention may include an iodine-containing compound. Typical of such compounds may be iodine, iodine halides, inorganic iodides, and organic iodides. The iodine halides which may be used herein may include iodine halides, such as IBr, ICl, $ICl_3$, and $IF_5$. Typical inorganic iodides may include iodides of phosphorous such as $PI_3$, $P_2I_4$ and $PCl_3I_2$ and iodides of metals of Groups I–VIII of the Periodic Table such as the iodides of Li, Na, K, Mg, Ca, Sr, Ba, Al, Ga, Ti, Zr, Sn, Pb, Sb, Bi, V, Cr, Mo, W, Mn, Fe, Co, Ni, Cu, Zn, Cd, Ag and Hg. Typical organic iodides may include alkyl, alkenyl, aryl, aralkyl, alkaryl iodides e.g. butyl iodide, and organotin iodides such as alkyl, alkenyl, aryl, aralkyl, alkaryl tin iodides e.g. dibutyltin diiodide.

When the first component of the catalyst system to be used is an iodine-containing compound in particular, such as ammonium iodide, pyridinium iodide and tetraethylphosphonium iodide, etc., it can also be used as the second component of the system, Accordingly, the reaction proceeds smoothly in the presence of one of these compounds alone.

In the nitrogen-containing organic compounds and phosphorus-containing organic compounds included in the first component and iodine-containing organic and organotin compounds of the second component, the number of carbon atoms possessed by each of the organic groups bonded with said nitrogen, phosphorus and iodine atom is preferably, from the standpoint of ready availability and reasonable cost, 1–18 carbon atoms per one organic group.

When the intended product of the process of the invention is alkyl tin iodide, i.e., when an alkyl iodide is used as the starting material, the addition separately of the foregoing second catalytic component can be omitted, since the starting material itself serves also as the second component of the catalyst system.

As indicated below, the use of the first and second catalytic components in a very small amount is sufficient, and moreover these small amounts work very effectively. Typically the nitrogen- or phosphorus-containing component, i.e. the first component, is used in a range of 0.001–0.5 mole per one gram atom of the tin metal, the best results being exhibited with the use of 0.003–0.3 mole. More specifically, in the reactions wherein alkyl iodides and alkyl bromides are used as the starting material, most favorable results are given with the use of 0.003–0.3 mole of the first catalytic component per one gram atom of the tin metal. On the other hand, in the reactions wherein alkyl chlorides are used as the starting material, best results are given with the use of 0.03–0.3 mole per one gram atom of the tin metal.

As to the iodine-containing component, i.e. the second catalytic component, it need not be added in the case of the reactions between alkyl iodides and tin, as already stated hereinbefore. When the alkyl bromides are used as the starting material, 0.002 mole or more per one mole of the alkyl bromide used will suffice. On the other hand, when the alkyl chlorides are used as the starting material, the second catalytic component is preferably used in an amount of 0.01 mole or more per one mole of the alkyl chloride used.

The mole ratio between the starting materials—the alkyl halides and the tin—may be selected optionally, an excess of either component being recoverable. An alkyl halide/tin mole ratio of from 2 to 3 is most suitable.

While the reaction proceeds smoothly at relatively low temperatures, a suitable temperature range is 100°–200° C. More specifically, when it is desired to obtain selectively a dialkyl tin diiodide by the reaction of an alkyl iodide with tin, a temperature of 100°–150° C. is suitable. Although the reaction proceeds at a still higher rate if the temperature is above 150° C., in this case the amount formed of alkyl tin triiodide and trialkyl tin iodide becomes great. When the reaction is between an alkyl bromide or alkyl chloride and tin, 130°–200° C. is suitable. Below 130° C., the reaction may proceed at a lower rate and the time required for the reaction will be prolonged. On the other hand, temperatures above about 200° C. may cause the decomposition of either the starting materials or the reaction product. While there is an interrelationship between the reaction time and the reaction temperature, the time is in general shorter than that of the conventional processes. Typically, the reaction is completed normally in 2–4 hours in the case of a reaction of an alkyl iodide with tin. When the reaction is between an alkyl bromide or alkyl chloride and tin, excepting those cases in which the alkyl radical is methyl or ethyl, the time required is normally 3–10 hours. When the alkyl radical is either methyl or ethyl, good results are given with shorter times than the above case.

The reaction is carried out in either an open or a sealed vessel, taking into consideration the boiling point of the material alkyl halide and the reaction temperature. In this case, for attaining satisfactory contact between the reaction components, it is preferred that the reaction components are in a state of agitation. After completion of the reaction, if there is present an excess of the starting material, this can be recovered by separation and reused as the material for a subsequent reaction. The reaction product may readily be recovered by suitable treatment such as distillation or chemical treatments (see Example 9), etc. whereby the intended alkyl tin halide can be separated and obtained in high purity and good yield.

Thus, by following the process of the present invention, it becomes possible to produce the various alkyl tin halides economically and advantageously by means of simple operations. The principal features of the process of this invention include those summarized below:

(1) When the alkyl iodides and tin are reacted, the reaction time is shorter than that of the conventional processes.

(2) In the reaction of the alkyl iodides with tin, nearly all the dialkyl tin diiodides are formed selectively.

(3) In the reaction of the alkyl bromides with tin, the reaction proceeds fully even when using the long chain alkyl bromides.

(4) While there is no prior art instance of the reaction of the alkyl chlorides with tin having succeeded with the long chain alkyls of propyl and longer, the present invention succeeded in doing so for the first time and moreover in high yield.

(5) The types of alkyls and halogens of the starting material alkyl halides can be optionally selected over a wide range; and furthermore the yields of corresponding products, alkyl tin halides, are high in all instances. Thus, the reaction can be carried out with the low-cost alkyl chlorides being chosen to meet the demand for economy.

In order to illustrate the present invention further, the following examples are given, it being understood that the invention should not be limited thereby.

EXAMPLE 1

A reactor (300-cc. agitating type stainless steel autoclave) was charged with 29.7 g. of tin granules, 50.5 g. of methyl chloride, 2.8 g. of methyl iodide and 2.0 g. of triethylamine and the mixture was heated for 2 hours at 170–175° C., after which it was allowed to cool to room temperature. The reaction mixture was then taken out and subjected to distillation under atmospheric pressure to obtain 6.6 g. of methyl tin trichloride, 39.2 g. of dimethyl tin dichloride and 4.6 g. of trimethyl tin chloride at a total yield of 91.5%.

EXAMPLE 2

The same reactor as was employed in Example 1 (unless otherwise specified, the term "reactor" as used in the hereinafter given examples will denote the same reactor) was charged with 29.7 g. of tin foil, 50.5 g. of methyl chloride, 1 g. of methyl iodide and 3.0 g. of triethylphosphate followed by reacting for 4 hours at 170–175° C. After completion of the reaction, the reaction mixture was subjected to distillation at atmospheric pressure to obtain 6.8 g. of methyl tin trichloride, 40.3 g. of dimethyl tin dichloride and 4.7 g. of trimethyl tin chloride, at a total yield of 93%.

EXAMPLE 3

The reactor was charged with 29.7 g. of tin foil, 50.5 g. of methyl chloride, 3.3 g. of potassium iodide and 4.0 g. of triphenylmethylphosphonium bromide followed by heating the mixture for 2 hours at 183–190° C. Then, after being allowed to cool to room temperature, the reaction mixture was taken out and subjected to distillation at atmospheric pressure to obtain 2.7 g. of methyl tin trichloride, 48.1 g. of dimethyl tin dichloride and 1.2 g. of trimethyl tin chloride, at a total yield of 94.4%.

EXAMPLE 4

The reactor was charged with 50 g. of tin foil, 80 g. of methyl chloride, 3.0 g. of iodine chloride and 0.4 g. of pyridine and the mixture was heated for 4 hours at 140–150° C., after which it was allowed to cool to room temperature. The reaction mixture was then taken out and subjected to distillation under atmospheric pressure to obtain 78.6 g. of dimethyl tin dichloride at a yield of 85.0%.

EXAMPLE 5

The reactor was charged with 29.7 g. of tin foil, 90 g. of methyl bromide, 1 g. of methyl iodide and 0.4 g. of triethylamine. Then, after the reaction was carried out for 2 hours at 180–185° C., the reaction mixture was subjected to distillation at atmospheric pressure to obtain 5.1 g. of methyl tin tribromide, 63.9 g. of dimethyl tin dibromide and 2.2 g. of trimethyl tin bromide, at a total yield of 92.0%.

EXAMPLE 6

After charging the reactor with 29.7 g. of tin foil, 106 g. of methyl iodide and 0.24 g. of aniline, the mixture was heated for 2 hours at 125–130° C., following which it was allowed to cool to room temperature. The reaction mixture was then taken out and subjected to vacuum distillation to obtain 109.9 g. (85.8% yield) of dimethyl tin diiodide.

EXAMPLE 7

The reactor was charged with 29.7 g. of tin foil, 106 g. of methyl iodide and 0.1 g. of trimethylamine and the reactants were heated for 2 hours at 106–110° C. The reaction mixture was then allowed to cool to room temperature, following which the excess methyl iodide was distilled off from the reaction mixture. When the concentrated residue was subjected to distillation at atmospheric pressure, 96.7 g. (96% yield) of dimethyl tin diiodide having a boiling point of 226.5–228° C. was obtained in high purity.

EXAMPLE 8

The reactor was charged with 29.7 g. of tin foil, 106 g. of methyl iodide and 0.3 g. of triethylphosphate and the reaction was carried out for 2 hours at 100–110° C. After completion of the reaction, the reaction mixture was cooled to room temperature and the excess methyl iodide was distilled off. Then by subjecting the reaction mixture to distillation at atmospheric pressure 97.5 g. (96.8% yield) of dimethyl tin diiodide having a boiling point of 227–228° C. was obtained.

EXAMPLE 9

The reactor was charged with 29.7 g. of tin foil, 64.5 g. of ethyl chloride, 3.2 g. of ethyl iodide and 2.0 g. of alpha-picoline, and the reaction was carried out for 2.5 hours at 170–175° C., after which the reaction mixture was allowed to cool to room temperature. The reaction mixture was then taken out and, after distilling off the excess ethyl chloride at atmospheric pressure, the reaction mixture was subjected to vacuum distillation. The total fraction distilled off was separated by using a chemical separation process. Namely, the total fraction distilled off was dissolved in 150 cc. of ether and, after cooling, to this was added a 20% aqueous solution of NaOH [27 g. of NaOH (on the assumption that the fraction is diethyl tin dichloride, a threefold equivalent thereof) dissolved in water]. The resulting solid diethyl tin oxide was filtered under reduced pressure. Extraction was carried out by adding 150 cc. of ether to the filtrate and two layers were separated. When carbon dioxide was passed through the aqueous layer, solid ethyl stannonic acid was separated. On the other hand, the ether layer was shaken together with 70 cc. of a 20% HCl aqueous solution followed by shaking this ether layer thoroughly with 70 cc. of a 20% KF aqueous solution to obtain triethyl tin fluoride. Each of the solids was dried under reduced pressure until no further reduction in weight occurred, whereby were obtained, calculated as ethyl tin chloride, 4.1 g. of ethyl tin trichloride, 51.5 g. of diethyl tin dichloride and 1.7 g. of triethyl tin chloride, at a total yield of 92.5%.

EXAMPLE 10

The reactor was charged with 29.7 g. of tin foil, 64.5 g. of ethyl chloride, 20 g. of zinc iodide and 3.3 g. of tetraethylammonium chloride, and the reaction was carried out for 4 hours at 165–170° C. Then, after allowing the reaction mixture to cool to room temperature, it was taken out and the excess ethyl chloride was distilled off at atmospheric pressure. The reaction mixture was then subjected to distillation, following which the total fraction distilled was separated using a chemical separation process, whereby were obtained 7.6 g. of ethyl tin trichloride, 43.5 g. of diethyl tin dichloride and 5.0 g. of triethyl tin chloride, at a total yield of 90.5%.

EXAMPLE 11

The reactor was charged with 29.7 g. of tin foil, 64.5 g. of ethyl chloride, 3.2 g. of ethyl iodide and 3.3 g. of triethylphosphite, and the reaction was carried out for 4 hours at 160–165° C. Upon completion of the reaction, the reaction mixture, after being cooled to room temperature, was taken out of the reactor, and after eliminating the excess ethyl chloride, was subject to chemical separation to obtain 8.2 g. of ethyl tin trichloride, 43.3 g. of diethyl tin dichloride and 5.5 g. of triethyl tin chloride, at a total yield of 91.9%.

EXAMPLE 12

The reactor was charged with 29.7 g. of powdered tin, 90 g. of ethyl bromide, 1.0 g. of zinc iodide and 0.5 g. of triphenyl phosphate, and the reaction was carried out for 3 hours at 150–155° C. After completion of the reaction, the reaction mixture was treated as in Example 9 to obtain 14.9 g. of ethyl tin tribromide, 59.8 g. of diethyl tin dibromide and 6.9 g. of triethyl tin bromide, at a total yield of 96.1%.

EXAMPLE 13

The reactor was charged with 29.7 g. of tin foil, 90 g. of ethyl bromide, 2.0 g. of stannous iodide and 0.5 g. of tributylphosphite, and the reaction was carried out for 2.5 hours at 165–170° C. After completion of the reaction, the reaction mixture was taken out after having cooled to room temperature. Then after removing the excess ethyl bromide from the reaction mixture, it was separated using the chemical separation procedure, whereby were obtained 5.2 g. of ethyl tin tribromide, 68.9 g. of diethyl tin dibromide and 1.9 g. of triethyl tin bromide, at a total yield of 89.9%.

EXAMPLE 14

The reactor was charged with 29.7 g. of tin foil, 117 g. of ethyl iodide and 0.3 g. of tetraethylammonium chloride, and the reaction was carried out for 2 hours at 105–115° C. After completion of the reaction, the excess ethyl iodide was distilled off. The reaction mixture was then subjected to vacuum distillation to obtain in high purity 98.7 g. of diethyl tin diiodide at a yield of 91.6%.

EXAMPLE 15

The reactor was charged with 29.7 g. of granular tin, 117 g. of ethyl iodide and 0.5 g. of triphenylphosphate, and the reaction was carried out for 2 hours at 105–120° C. After completion of the reaction, the excess ethyl iodide was distilled off. Then by subjecting the reaction mixture to vacuum distillation 99.5 g. of diethyl tin diiodide was obtained in high purity at a yield of 92.3%.

EXAMPLE 16

The reactor was charged with 29.7 g. of powdered tin, 58.8 g. of n-propyl chloride, 3.0 g. of silver iodide and 2.4 g. of morpholine, and the reaction was carried out for 4 hours at 155–160° C. After completion of the reaction, the operations as described in Example 9 were carried out to obtain 9.0 g. of n-propyl tin trichloride, 47.0 g. of di-n-propyl tin dichloride and 6.4 g. of tri-n-propyl tin chloride, at a total yield of 90.6%.

EXAMPLE 17

The reactor was charged with 29.7 g. of granular tin, 58.8 g. of n-propyl chloride, 3.2 g. of propyl iodide and 3.2 g. of dipropylphosphite, and the reaction was carried out for 4 hours at 160–165° C. By operating as in Example 9 after completion of the reaction 11.9 g. of n-propyl tin trichloride, 42.7 g. of di-n-propyl tin dichloride and 6.2 g. of tri-n-propyl tin chloride were obtained at a total yield of 88.3%.

EXAMPLE 18

The reactor was charged with 29.7 g. of tin foil, 92.3 g. of n-propyl bromide, 1.1 g. of di-n-propyl tin diiodide and 0.9 g. of triethylbutylammonium iodide, and the reaction was carried out for 3 hours at 168–173° C. By operating as in Example 9 after completion of the reaction 6.0 g. of n-propyl tin tribromide, 61.6 g. of di-n-propyl tin dibromide and 1.3 g. of tri-n-propyl tin bromide were obtained at a total yield of 75.1%.

EXAMPLE 19

The reactor was charged with 29.7 g. of tin granules, 127 g. of n-propyl iodide and 0.24 g. of morpholine, and the reaction was carried out for 2 hours at 115–120° C. By operating as in Example 14 after completion of the reaction 107.6 g. of di-n-propyl tin diiodide was obtained at a yield of 94%.

EXAMPLE 20

The reactor was charged with 29.7 g. of powdered tin, 127 g. of n-propyl iodide and 0.5 g. of urethane, and the reaction was carried out for 2 hours at 120–125° C. By operating as in Example 14 after completion of the reaction 101.3 g. of di-n-propyl tin diiodide was obtained at a yield of 88.5%.

EXAMPLE 21

The reactor was charged with 29.7 g. of powered tin, 127 g. of isopropyl iodide and 0.2 g. of pyridine, and the reaction was carried out for 2 hours at 125–130° C. By operating as in Example 14 after completion of the reaction 99.5 g. of diisopropyl tin diodide was obtained at a yield of 86.8%.

EXAMPLE 22

The reactor was charged with 29.7 g. of tin foil, 127 g. of isopropyl iodide and 0.8 g. of triphenylphosphite, and the reaction was carried out for 2 hours at 125–130° C. By operating as in Example 14 after completion of the reaction 95.5 g. of diisopropyl tin diiodide was obtained at a yellow of 83.3%.

EXAMPLE 23

The reactor was charged with 29.7 g. of tin foil, 127 g. of isopropyl iodide and 0.5 g. of diphenylphosphinous acid ethyl ester and the reaction was carried out for 2 hours at 120–125° C. By operating as in Example 14 after completion of the reaction 101.3 g. of diisopropyl tin diiodide was obtained at a yield of 88.5%.

EXAMPLE 24

The reactor was charged with 29.7 g. of tin foil, 69.4 g. of n-butyl chloride, 3.5 g. of n-butyl iodide and 2.6 g. of dibutylamine, and the reaction was carried out for 5 hours at 155–160° C. By operating as in Example 9 after completion of the reaction 11.9 g. of n-butyl tin trichloride, 66.8 g. of di-n-butyl tin dichloride and 4.1 g. of tri-n-butyl tin chloride were obtained at a total yield of 83.7%.

EXAMPLE 25

The reactor was charged with 29.7 g. of tin foil, 69.4 g. of n-butyl chloride, 3.2 g. of sodium iodide and 2.0 g. of triethylamine, and the reaction was carried out for 5 hours at 160–165° C. By operating as in Example 9 after completion of the reaction 4.7 g. of n-butyl tin trichloride, 55.1 g. of di-n-butyl tin dichloride and 3.4 g. of tri-n-butyl tin chloride were obtained at a total yield of 83.4%.

EXAMPLE 26

The reactor was charged with 29.7 g. of tin foil, 69.4 g. of n-butyl chloride, 3.5 g. of di-n-butyl tin diiodide and 2.0 g. of triethylamine, and the reaction was carried out for 5 hours at 160–165° C. By operating as in Example 9 after completion of the reaction 8.4 g. of n-butyl tin trichloride, 48.3 g. of di-n-butyl tin dichloride and 5.4 g. of tri-n-butyl tin chloride were obtained at a total yield of 82.7%.

EXAMPLE 27

The reactor was charged with 29.7 g. of tin granules, 69.4 g. of n-butyl chloride, 3.2 g. of sodium iodide and 5.2 g. of tetraethylammonium chloride, and the reaction was carried out for 5 hours at 155–163° C. By operating as in Example 9 after completion of the reaction 6.7 g. of n-butyl tin trichloride, 48.4 g. of di-n-butyl tin dichloride and 5.3 g. of tri-n-butyl tin chloride were obtained at a total yield of 80.5%.

EXAMPLE 28

The reactor was charged with 29.7 g. of tin foil, 69.4 g. of n-butyl chloride, 2.7 g. stannous iodide and 2.0 g. pyridine, and the reaction was carried out for 6 hours at 160–165° C. By operating as in Example 9 after completion of the reaction 4.2 g. of n-butyl tin trichloride, 57.0 g. of di-n-butyl tin dichloride and 2.7 g. of tri-n-butyl tin chloride were obtained at a total yield of 84.3%.

EXAMPLE 29

The reactor was charged with 29.7 g. of tin foil, 69.4 g. of n-butyl chloride, 3.5 g. of n-butyl iodide and 2.2 g. of bipyridyl, and the reaction was carried out for 5 hours at 155–160° C. By operating as in Example 9 after completion of the reaction 8.1 g. of n-butyl tin trichloride, 50.3 g. of di-n-butyl tin dichloride and 6.0 g. of tri-n-butyl tin chloride were obtained at a total yield of 85.0%.

EXAMPLE 30

The reactor was charged with 29.7 g. of tin foil, 69.4 g. of n-butyl chloride, 3.8 g. of n-butyl iodide and 2.3 g. of tris-(diethylamino-phosphine oxide and the reaction was carried out for 5 hours at 163–169° C. By operating as in Example 9 after completion of the reaction 9.9 of n-butyl tin trichloride, 45.8 g. of di-n-butyl tin dichloride and 5.3 g. of tri-n-butyl tin chloride were obtained at a total yield of 81.5%.

EXAMPLE 31

The reactor was charged with 29.7 g. of tin foil, 69.4 g. of n-butyl chloride, 3.5 g. of n-butyl iodide and 3.3 g. of diphenylchlorophosphine, and the reaction was carried out for 5 hours at 155–160° C. By operating as in Example 9 after completion of the reaction 9.1 g. of n-butyl tin trichloride, 47.3 g. of di-n-butyl tin dichloride and 8.3 g. of tri-n-butyl tin chloride were obtained at a total yield of 85.1%.

EXAMPLE 32

The reactor was charged with 29.7 g. of tin foil, 69.4 g. of n-butyl chloride, 3.0 g. of potassium iodide and 2.7 g. of triphenylphosphine, and the reaction was carried out for 5 hours at 155–160° C. By operating as in Example 9 after completion of the reaction 8.9 g. of n-butyl tin trichloride, 48.0 g. of di-n-butyl tin dichloride and 8.4 g. of tri-n-butyl tin chloride were obtained at a total yield of 86.2%.

EXAMPLE 33

The reactor was charged with 29.7 g. of tin foil, 69.4 g. of n-butyl chloride, 2.0 g. of zinc iodide and 2.6 g. of triphenylphosphine, and the reaction was carried out for 5 hours at 155–163° C. By operating as in Example 9 after completion of the reaction 4.6 g. of n-butyl tin trichloride, 54.2 g. of di-n-butyl tin dichloride and 3.3 g. of tri-n-butyl tin chloride were obtained at a total yield of 81.9%.

EXAMPLE 34

The reactor was charged with 29.7 g. of tin foil, 69.4 g. of n-butyl chloride, 3.5 g. of di-n-butyl tin diiodide and 2.4 g. of triethylphosphine, and the reaction was carried out for 5 hours at 155–160° C. By operating as in Example 9 after completion of the reaction 9.1 g. of n-butyl tin trichloride, 53.5 g. of di-n-butyl tin dichloride and 6.7 g. of tri-n-butyl tin chloride were obtained at a total yield of 91.5%.

EXAMPLE 35

The reactor was charged with 29.7 g. of powdered tin, 69.4 g. of n-butyl chloride, 2.8 g. of stannous iodide and 3.2 g. of triethylphosphine, and the reaction was carried out for 5 hours at 165–170° C. By operating as in Example 9 after completion of the reaction 8.8 g. of n-butyl tin trichloride, 51.2 g. of di-n-butyl tin dichloride and 7.2 g. of tri-n-butyl tin chloride were obtained at a total yield of 88.6%.

EXAMPLE 36

The reactor was charged with 29.7 g. of tin foil, 103 g. of n-butyl bromide, 1.0 g. of iodine and 0.5 g. of quinoline, and the reaction was carried out for 3 hours at 158–163° C. By operating as in Example 9 after completion of the reaction 8.6 g. of n-butyl tin tribromide, 76.5 g. of di-n-butyl tin dibromide and 5.1 g. of tri-n-butyl tin bromide were obtained at a total yield of 91.7%.

EXAMPLE 37

The reactor was charged with 29.7 g. of tin foil, 103 g. of n-butyl bromide, 1.0 g. of aluminum iodide and 0.4 g. of diphenylphosphinous acid ethyl ester, and the reaction was carried out for 4 hours at 150–155° C. By operating as in Example 9 after completion of the reaction 15.3 g. of n-butyl tin tribromide, 67.8 g. of di-n-butyl tin dibromide and 7.7 g. of tri-n-butyl tin bromide were obtained at a total yield of 92.0%.

EXAMPLE 38

A 300-cc. 3-necked flask equipped with a stirrer, condenser and thermometer was charged with 29.7 g. of tin foil, 138 g. of n-butyl iodide and 0.25 g. of triethylamine, and the reaction was carried out for 2 hours at 125–130° C. By operating as in Example 14 after completion of the reaction 111.9 g. of di-n-butyl tin diiodide was obtained at a yield of 91.8%.

EXAMPLE 39

A 3-necked flask similar to that employed in Example 38 was charged with 29.7 g. of tin foil, 138 g. of n-butyl iodide and 0.31 g. of triethanolamine, and the reaction was carried out for 3 hours at 129–139° C. By operating as in Example 14 after completion of the reaction 108.3 g. of di-n-butyl tin diiodide was obtained at a yield of 89.1%.

EXAMPLE 40

A 3-necked flask similar to that employed in Example 38 was charged with 29.7 g. of tin foil, 138 g. of n-butyl iodide and 0.54 g. of triethylbenzylammonium chloride, and the reaction was carried out for 2.5 hours at 129–135° C. By operating as in Example 14 after completion of the reaction 112.3 g. of di-n-butyl tin diiodide was obtained at a yield of 92.3%.

EXAMPLE 41

A 3-necked flask similar to that employed in Example 38 was charged with 29.7 g. of tin foil, 138 g. of n-butyl iodide and 0.5 g. of triphenylphosphine, and the reaction was carried out for 2 hours at 130–140° C. By operating as in Example 14 after completion of the reaction 113.2 g. of di-n-butyl tin diiodide was obtained at a yield of 93.0%.

EXAMPLE 42

A 3-necked flask similar to that employed in Example 38 was charged with 29.7 g. of tin foil, 138 g. of n-butyl iodide and 0.5 g. of tris-(diethylamino)-phosphine, and the reaction was carried out for 2 hours at 130–135° C. By operating as in Example 14 after completion of the reaction 114.1 g. of di-n-butyl tin diiodide was obtained at a yield of 93.5%.

EXAMPLE 43

A 3-necked flask similar to that employed in Example 38 was charged with 29.7 g. of tin foil, 138 g. of n-butyl iodide and 0.5 g. of tris-(dibutylamino)-phosphine oxide, and the reaction was carried out for 2 hours at 130–135° C. By operating as in Example 14 after completion of the reaction 100.3 g. of di-n-butyl tin diiodide was obtained at a yield of 82.5%.

EXAMPLE 44

A 3-necked flask similar to that employed in Example 38 was charged with 29.7 g. of tin foil, 138 g. of n-butyl iodide and 0.5 g. of acetamide and the reaction was carried out for 2.5 hours at 129–133° C. By operating as in Example 14 after completion of the reaction 102 g. of di-n-butyl tin diiodide was obtained at a yield of 84.0%.

EXAMPLE 45

A 3-necked flask similar to that employed in Example 38 was charged with 29.7 g. of tin granules, 138 g. of n-butyl iodide and 0.6 g. of ammonium acetate, and the reaction was carried out for 3 hours at 128–132° C. By operating as in Example 14 after completion of the reaction 96.4 g. of di-n-butyl tin diiodide was obtained at a yield of 79.2%.

EXAMPLE 46

The reactor was charged with 29.7 g. of tin foil, 138 g. of n-butyl iodide and 0.5 g. of ammonia and the reaction was carried out for 3 hours at 130–135° C. By operating as in Example 14 after completion of the reaction 90.2 g. of di-n-butyl tin diiodide was obtained at a yield of 74.1%.

EXAMPLE 47

A 3-necked flask similar to that employed in Example 38 was charged with 29.7 g. of tin powder, 138 g. of n-butyl iodide and 1.0 g. of ammonium iodide and the reaction was carried out for 3 hours at 130–135° C. By operating as in Example 14 after completion of the reaction 82.5 g. of di-n-butyl tin diiodide was obtained at a yield of 71.5%.

EXAMPLE 48

A 3-necked flask similar to that employed in Example 38 was charged with 29.7 g. of tin foil, 138 g. of sec.-butyl iodide and 0.55 g. of tetrabutylammonium chloride, and the reaction was carried out for 2 hours at 120–130° C. By operating as in Example 14 after completion of the reaction 97.6 g. of di-sec.-butyl tin diiodide was obtained at a yield of 80.2%.

EXAMPLE 49

A 3-necked flask similar to that employed in Example 38 was charged with 29.7 g. of tin foil, 138 g. of sec.-butyl iodide and 0.4 g. of diphenylchlorophosphine, and the reaction was carried out for 2 hours at 113–120° C. By operating as in Example 14 after completion of the reaction 96.5 g. of di-sec.-butyl tin diiodide was obtained at a yield of 79.3%.

EXAMPLE 50

The reactor was charged with 29.7 g. of tin foil, 79.7 g. of n-amyl chloride, 2.8 g. of stannous iodide and 2.0 g. of pyridine, and the reaction was carried out for 6 hours at 160–165° C. By operating as in Example 9 after completion of the reaction 10.6 g. of n-amyl tin trichloride, 50.0 g. of di-n-amyl tin dichloride and 4.4 g. of tri-n-amyl tin chloride were obtained at a total yield of 79.5%.

EXAMPLE 51

The reactor was charged with 29.7 g. of tin foil, 79.7 g. of n-amyl chloride, 3.0 g. of n-amyl iodide and 2.4 g. of tris-(diethylamino)phosphine, and the reaction was carried out for 6 hours at 165–170° C. By operating as in Example 9 after completion of the reaction 5.4 g. of n-amyl tin trichloride, 58.2 g. of di-n-amyl tin dichloride and 3.9 g. of tri-n-amyl tin chloride were obtained at a total yield of 80.8%.

EXAMPLE 52

The reactor was charged with 29.7 g. of tin foil, 113 g. of n-amyl bromide, 1.0 g. of magnesium iodide and 0.5 g. of triphenylphosphine, and the reaction was carried out for 5 hours at 150–155° C. By operating as in Example 9 after completion of the reaction 15.1 g. of n-amyl tin tribromide, 72.2 g. of di-n-amyl tin dibromide and 5.4 g. of tri-n-amyl tin bromide were obtained at a total yield of 87.9%.

EXAMPLE 53

The reactor was charged with 29.7 g. of tin foil, 90.5 g. of n-hexyl chloride, 2.7 g. of aluminum iodide and 5.0 g. of $(C_4H_9)_2SnCl_2 \cdot 2Et_3N$, and the reaction was carried out for 6 hours at 160–165° C. By operating as in Example 10 after completion of the reaction 10.6 g. of n-hexyl tin trichloride, 53.2 g. of di-n-hexyl tin dichloride and 3.9 g. of tri-n-hexyl tin chloride were obtained at a total yield of 76.5%.

EXAMPLE 54

The reactor was charged with 29.7 g. of tin foil, 90.5 g. of n-hexyl chloride, 3.3 g. of zinc iodide and 3.5 g. of methyl triphenylphosphonium bromide, and the reaction was carried out for 6 hours at 160–165° C. By operating as in Example 9 after completion of the reaction 9.3 g. of n-hexyl tin trichloride, 51.3 g. of di-n-hexyl tin dichloride and 6.2 g. of tri-n-hexyl tin chloride were obtained at a total yield of 75.1%.

EXAMPLE 55

The reactor was charged with 29.7 g. of tin foil, 124 g. of n-hexyl bromide, 1.0 g. of n-hexyl iodide and 2.6 g. of butylamine, and the reaction was carried out for 8 hours at 170–173° C. By operating as in Example 9 after completion of the reaction 9.5 g. of n-hexyl tin tribromide, 80.5 g. of di-n-hexyl tin dibromide and 5.8 g. of tri-n-hexyl tin bromide was obtained at a total yield of 85.5%.

EXAMPLE 56

A 3-necked flask similar to that employed in Example 38 was charged with 29.7 g. of powdered tin, 159 g. of n-hexyl iodide and 1.4 g. of $(C_4H_9)_2SnI_2 \cdot 2Et_3N$, and the reaction was carried out for 3 hours at 135–145° C. After completion of the reaction, the excess n-hexyl iodide was distilled off. Then, by treating the reaction product with alkali followed by a hydrochloric acid treatment, conversion to di-n-hexyl tin dichloride was effected, after which distillation thereof was carried out to obtain 110 g. (81.2% yield) of di-n-hexyl tin diiodide, calculated by reverse operation from the chloride.

EXAMPLE 57

A 3-necked flask similar to that employed in Example 38 was charged with 29.7 g. of tin foil, 159 g. of n-hexyl iodide and 0.6 g. of methyl triphenylphosphonium bromide, and the reaction was carried out for 2 hours at 140–150° C., after which the unreacted substances were removed. The reaction product was then treated with alkali followed by a hydrochloric acid treatment thereby converting the product into di-n-hexyl tin dichloride, following which distillation thereof was carried out to obtain di-n-hexyl tin diiodide at a yield of 82.1%, as calculated by reverse operation from the chloride.

EXAMPLE 58

A 3-necked flask similar to that employed in Example 38 was charged with 29.7 g. of tin foil, 111 g. of n-octyl chloride, 3.0 g. of iodine and 3.0 g. of butylamine, and the reaction was carried out for 10 hours at 160–170° C. By operating as in Example 9 after completion of the reaction 9.6 g. of n-octyl tin trichloride, 47.4 g. of di-n-octyl tin dichloride and 2.0 g. of tri-n-octyl tin chloride were obtained at a total yield of 59.1%.

EXAMPLE 59

A 3-necked flask similar to that employed in Example 38 was charged with 29.7 g. of tin granules, 94.3 g. of n-octyl chloride, 9.7 g. of dibutylamine, and 6.3 g. of iodine, and the reaction was carried out for 6 hours at 180–184° C. By operating as in Example 9 after completion of the reaction 11.5 g. of n-octyl tin trichloride, 70.7 g. of di-n-octyl tin dichloride and 6.3 g. of tri-n-octyl tin chloride were obtained at a total yield of 86.7%.

EXAMPLE 60

A 3-necked flask similar to that employed in Example 38 was charged with 29.7 g. of tin foil, 111 g. of n-octyl chloride, 3.0 g. of potassium iodide and 1.9 g. of diphenylphosphine, and the reaction was carried out for 7 hours at 165°–170° C. By operating as in Example 9 after completion of the reaction 9.7 g. of n-octyl tin trichloride, 50.5 g. of di-n-octyl tin dichloride and 4.7 g. of tri-n-octyl tin chloride were obtained at a total yield of 61.1%.

EXAMPLE 61

A 500-cc 3-necked flask equipped with a stirrer, condenser and thermometer was charged with 29.7 g. of tin foil, 145 g. of n-octyl bromide, 1.5 g. of mercuric iodide and 0.6 g. of N,N'-dibutyltriethylene-diammonium dibromide, and the reaction was carried out for 8 hours at 165–175° C. By operating as in Example 9 after completion of the reaction 7.9 g. of n-octyl tin tribromide, 65.3 g. of di-n-octyl tin dibromide and 3.3 g. of tri-n-octyl tin bromide were obtained at a total yield of 60.8%.

EXAMPLE 62

A 3-necked flask similar to that employed in Example 61 was charged with 29.7 g. of tin foil, 145 g. of n-octyl bromide and 1.0 g. of n-octyl triphenylphosphonium iodide, and the reaction was carried out for 7 hours at 165–170° C. By operating as in Example 9 after completion of the reaction 15.6 g. of n-octyl tin tribromide, 75.3 g. of di-n-octyl tin dibromide and 6.3 g. of tri-n-octyl tin bromide were obtained at a total yield of 77.6%.

EXAMPLE 63

A 3-necked flask similar to that employed in Example 61 was charged with 29.7 g. of tin foil, 180 g. of n-octyl iodide and 0.5 g. of dibutylamine, and the reaction was carried out for 5 hours at 160–170° C. After completion of the reaction, the excess n-octyl iodide was removed. Then by separating employing the chemical separation procedure 89.5 g. of di-n-octyl tin diiodide was obtained at a yield of 59.7%.

EXAMPLE 64

A 3-necked flask similar to that employed in Example 61 was charged with 29.7 g. of tin foil, 180 g. of n-octyl iodide and 0.25 g. of triethylenediamine, and the reaction was carried out for 4 hours at 150–155° C. By operating as in Example 56 after completion of the reaction 129.6 g. of di-n-octyl tin diiodide was obtained at a yield of 74.8%.

EXAMPLE 65

A 3-necked flask similar to that employed in Example 61 was charged with 29.7 g. of tin foil, 180 g. of n-octyl iodide and 0.4 g. of tributylphosphine, and the reaction was carried out for 4 hours at 160–170° C. By operating as in Example 56 after completion of the reaction 131.7 g. of di-n-octyl tin diiodide was obtained at a yield of 76.0%.

EXAMPLE 66

A 500-cc. 3-necked flask equipped with a stirrer, condenser and thermometer was charged with 29.7 g. of tin foil, 222 g. of n-dodecyl iodide and 0.6 g. of dipropylphosphite, and the reaction was carried out for 5 hours at 165–173° C. After completion of the reaction, the excess n-dodecyl iodide was removed, following which separation was effected employing the chemical separation procedure, whereby 77.5 g. of di-n-dodecyl tin diiodide was obtained at a yield of 43.6%.

EXAMPLE 67

The reactor was charged with 29.7 g. of tin foil, 90 g. of cyclohexyl chloride, 3.2 g. of potassium iodide and 3.0 g. of triethylamine, and the reaction was carried out for 8 hours at 160–165° C. by operating as in Example 9 after completion of the reaction 9.7 g. of cyclohexyl tin trichloride, 44.5 g. of dicyclohexyl tin dichloride and 1.3 g. of tricyclohexyl tin chloride were obtained at a total yield of 63.9%.

EXAMPLE 68

The reactor was charged with 29.7 g. of tin foil, 90 g. of cyclohexyl chloride, 2.8 g. of iodine and 5.0 g. of tris-(diethylamine)-phosphine, and the reaction was carried out for 8 hours at 160–165° C. By operating as in Example 9 after completion of the reaction 3.0 g. of cyclohexyl tin trichloride, 30.3 g. of dicyclohexyl tin dichloride and 0.8 g. of tricyclohexyl tin chloride were obtained at a total yield of 38.7%.

EXAMPLE 69

The reactor was charged with 29.7 g. of tin foil, 122 g. of cyclohexyl bromide, 1.4 g. of stannous iodide and 0.7 g. of triphenylthiophosphite, and the reaction was carried out for 5 hours at 155–160° C. By operating as in Example 9 after completion of the reaction 13.3 g. of cyclohexyl tin tribromide, 63.6 g. of dicyclohexyl tin dibromide and 2.4 g. of tricyclohexyl tin bromide were obtained at a total yield of 71.3%.

EXAMPLE 70

A 3-necked flask similar to that employed in Example 38 was charged with 29.7 g. of tin foil, 157 g. of cyclohexyl iodide and 0.4 g. of diphenylphosphine, and the reaction was carried out for 2 hours at 135–140° C. By operating as in Example 56 after completion of the reaction 100.5 g. of dicyclohexyl tin diiodide was obtained at a yield of 74.6%.

Although this invention has been illustrated by reference to specific examples, changes therein which clearly fall within the scope of the invention will be apparent to those skilled in the art. It is therefore to be limited solely by the scope of the appended claims.

We claim:

1. Process for producing alkyl tin halides having the general formula $R_mSnX_{4-m}$ wherein R is an alkyl radical containing 1–12 carbon atoms, X is an active halogen atom, and $m$ is an integer 1–3, which comprises reacting metallic tin with an alkyl halide having the general formula RX, wherein R and X are as hereinbefore indicated, said reaction being effected in the presence of catalytic amounts of (a) at least one compound selected from the group consisting of nitrogen-containing organic compounds, phosphorus-containing organic compounds, ammonia, hydrazine, hydroxylamine, and salts thereof, and (b) at least one iodine-containing compound.

2. The process of claim 1 wherein said nitrogen-containing organic compound is an amine.

3. The process of claim 1 wherein said nitrogen-containing organic compound is a heterocyclic amine containing 3–6 members in the heterocyclic ring.

4. The process of claim 1 wherein said nitrogen-containing organic compound is present in the form of a salt thereof with an organic acid.

5. The process of claim 1 wherein said nitrogen-containing organic compound is present in the form of a salt thereof with hydrogen halide.

6. The process of claim 1 wherein said nitrogen-containing organic compound is present in the form of a salt thereof with an oxy acid.

7. The process of claim 1 wherein said phosphorus containing organic compound is a compound having the general formula,

wherein $R_1$, $R_2$ and $R_3$ are the substituents selected from the group consisting of hydrogen atom, halogen atom, alkyl, aryl, aralkyl, alkaryl, alkoxy, aryloxy, alkylthio, arylthio, N-alkylamino, N,N-dialkylamino, and hydroxy radical.

8. The process of claim 1 wherein said phosphorus containing organic compound is a compound having the general formula,

wherein $R_1$, $R_2$ and $R_3$ are the substituents selected from the group consisting of hydrogen atom, halogen atom, alkyl, aryl, aralkyl, alkaryl, alkoxy, aryloxy, alkylthio, arylthio, N-alkylamino, N,N-dialkylamino, and hydroxy radical.

9. The process of claim 1 wherein said phosphorus containing organic compound is a compound having the general formula,

wherein $R_1$, $R_2$ and $R_3$ are the substituents selected from the group consisting of hydrogen atom, halogen atom, alkyl, aryl, aralkyl, alkaryl, alkoxy aryloxy, alkylthio, arylthio, N-alkylamino, N,N-dialkylamino, and hydroxy radical.

10. The process of claim 1 wherein said phosphorus containing organic compound is a compound having the general formula,

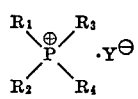

wherein $R_1$, $R_2$, $R_3$ and $R_4$ are the substituents selected from the group consisting of hydrogen atom, halogen atom, alkyl, aryl, aralkyl, alkaryl, alkoxy, aryloxy, alkylthio, arylthio, N-alkylamino, N,N-dialkylamino, and hydroxy radical, and Y is an active halogen.

11. The process of claim 1 wherein said salts of ammonia, hydrazine and hydroxylamine are the salts of an organic acid.

12. The process of claim 1 wherein said salts of ammonia, hydrazine and hydroxylamine are the salts of a hydrogen halide.

13. The process of claim 1 wherein said salts of ammonia, hydrazine and hydroxylamine are the salts of an oxy acid.

14. The process of claim 1 wherein said iodine-containing compound is iodine se.

15. The process of claim 1 wherein said iodine-containing compound is an organic iodide.

16. The process of claim 1 wherein said iodine-containing compound is an organotin iodide.

17. The process of claim 1 wherein said iodine-containing compound is a metal iodide.

18. The process of claim 1 wherein said iodine-containing compound is an iodine halide.

19. The process of claim 1 wherein R is a cycloalkyl radical.

20. The process of claim 1 wherein X is chlorine.

21. The process of claim 1 wherein X is bromine.

22. The process of claim 1 wherein X is iodine.

23. The process of claim 1 wherein the reaction is effected at a temperature of 100° C.–200° C.

References Cited
UNITED STATES PATENTS
3,085,102   4/1963   Yataga et al. _____ 260—429.7

WERTEN F. W. BELLAMY, Primary Examiner

UNITED STATES PATENT OFFICE
CERTIFICATE OF CORRECTION

Patent No. 3,745,183     Dated  July 10, 1973

Inventor(s)  T. KATSUMURA, et al.

It is certified that error appears in the above-identified patent and that said Letters Patent are hereby corrected as shown below:

Column 1 - lines 4 and 5 - delete "Tetsuya Matsunaga, Fuseshi, Osaka

Claim 1, line 4 - Following the word "atom" insert --selected from the group consisting of chlorine and bromine--.

Cancel Claim 22.

Signed and sealed this 13th day of August 1974.

(SEAL)
Attest:

McCOY M. GIBSON, JR.          C. MARSHALL DANN
Attesting Officer             Commissioner of Patents